US012595198B2

(12) United States Patent
    Vidal et al.

(10) Patent No.: US 12,595,198 B2
(45) Date of Patent: Apr. 7, 2026

(54) METHOD AND APPARATUS FOR WASTEWATER TREATMENT USING ULTRAFINE BUBBLES

(71) Applicant: YPF TECNOLOGÍA S.A., Ciudad Autónoma de Buenos Aires (AR)

(72) Inventors: Nuria Carolina Vidal, Berisso (AR); Alma Sinojmeri, Berisso (AR); Marcos Coustet, Berisso (AR); Jorge Luis Fasano, La Plata (AR); José Roberto Leunda, La Plata (AR)

(73) Assignee: YPF TECNOLOGÍA S.A., Ciudad Autónoma de Buenos Aires (AR)

( * ) Notice: Subject to any disclaimer, the term of this patent is extended or adjusted under 35 U.S.C. 154(b) by 0 days.

(21) Appl. No.: 17/528,919

(22) Filed: Nov. 17, 2021

(65) Prior Publication Data

US 2022/0153615 A1     May 19, 2022

Related U.S. Application Data

(60) Provisional application No. 63/115,400, filed on Nov. 18, 2020.

(51) Int. Cl.
    C02F 1/72        (2023.01)
    C02F 1/50        (2023.01)
        (Continued)

(52) U.S. Cl.
    CPC .............. C02F 1/727 (2013.01); C02F 1/50 (2013.01); C02F 1/74 (2013.01); C02F 1/78 (2013.01);
        (Continued)

(58) Field of Classification Search
    CPC .... C02F 1/727; C02F 1/50; C02F 1/74; C02F 1/78; C02F 2101/308; C02F 2101/32; C02F 2101/322; C02F 2101/34; C02F 2201/004; C02F 2301/046; C02F 2303/04; C02F 2303/26; C02F 7/00; C02F 1/72; C02F 2201/782; C02F 2201/78; C02F 3/20;
        (Continued)

(56) References Cited

U.S. PATENT DOCUMENTS 7,662,288 B2     2/2010 Yamasaki et al.

FOREIGN PATENT DOCUMENTS

JP       2019203047 A  * 11/2019
WO    WO-2017201016 A1 * 11/2017    ......... B01D 17/0205

OTHER PUBLICATIONS

Nirmalkar, N., Pacek, A.W. and Barigou, M., 2018. On the existence and stability of bulk nanobubbles. Langmuir, 34(37), pp. 10964-10973 (Year: 2018).*
        (Continued)

*Primary Examiner* — In Suk C Bullock
*Assistant Examiner* — Bernadette Karen Mcgann
(74) *Attorney, Agent, or Firm* — MUNCY, GEISSLER, OLDS & LOWE, P.C.

(57) ABSTRACT

A method and apparatus for wastewater treatment using ultrafine bubbles, wherein bubbles of 200 nm or less are contacted with a wastewater volume in continuous flow conditions by means of an ultrafine bubble generator, a source of oxygen, a tank, a first and a second pump, a pipe system and connectors, the connectors being configured such that continuous flow conditions are maintained in the pipe system.

3 Claims, 7 Drawing Sheets

(51) Int. Cl.

| | |
|---|---|
| *C02F 1/74* | (2023.01) |
| *C02F 1/78* | (2023.01) |
| *C02F 101/30* | (2006.01) |
| *C02F 101/32* | (2006.01) |
| *C02F 101/34* | (2006.01) |

(52) U.S. Cl.
CPC .... *C02F 2101/308* (2013.01); *C02F 2101/32* (2013.01); *C02F 2101/322* (2013.01); *C02F 2101/34* (2013.01); *C02F 2201/004* (2013.01); *C02F 2301/046* (2013.01); *C02F 2303/04* (2013.01)

(58) Field of Classification Search
CPC ...... C02F 3/202; C02F 3/1294; C02F 3/1278; C02F 3/1284; B01F 23/2373; B01F 23/20; B01F 23/23; B01F 23/231; B01F 23/23105; B01F 23/2319; B01F 23/237; B01F 23/2375; B01F 23/2376; B01F 23/23761; B01F 23/237611; B01F 23/237612; B01F 23/237613

See application file for complete search history.

(56) References Cited

OTHER PUBLICATIONS

Machine generated translation of JP-2019203047-A (Year: 2019).*
Chu et al., "Enhanced treatment of practical textile wastewater by microbubble ozonation," Process Safety and Environment Protection vol. 86 (2008) pp. 389-393, 5 pages.

* cited by examiner

NON-CONTINUOUS SET-UP

CONTINUOUS SET-UP

METHOD AND APPARATUS FOR WASTEWATER TREATMENT USING ULTRAFINE BUBBLES

CROSS REFERENCE TO RELATED APPLICATIONS

This application claims priority of U.S. Provisional Application No. 63/115,400 filed on Nov. 18, 2020 under 35 U.S.C. § 119(e), the entire contents of which are hereby incorporated by reference.

TECHNICAL FIELD

The present invention generally relates to the field of wastewater treatments. Specifically, the present invention relates to a method for wastewater treatment with in-situ generation of ultrafine bubbles.

BACKGROUND

The oil industry, including upstream, midstream, and downstream operations, produces wastewater containing dissolved hydrocarbons, which must be removed in order to meet legal requirements and minimize the environmental impact of oil-related processes. Most of these requirements include a total petroleum hydrocarbon (TPH) content between 30 and 50 mg/L. In some cases, an undetectable content is desired.

Removal of hydrocarbons is often carried out using traditional methods, such as aeration, aerobic biodegradation and advanced chemical oxidation. The elevated costs related to treatment efficiency and maintenance can have disadvantageous consequences, such as the methods not being optimized or their related facilities being out of service.

As regards the chemical methods, Fenton processes can achieve hydrocarbon oxidation generally by using a pH of about 3, as well as reagents iron(II) sulfate and hydrogen peroxide. Sludges are generated during a flocculation stage, and a continuous and stoichiometric addition of iron(II) sulfate and hydrogen peroxide is required. Continuous thermal control of the process is also required, since the chemical reaction is exothermal.

Regarding aeration methods, conventional aeration plants produce macrobubbles, with diameters ranging from a few millimeters to centimeters, that remain in the water for short periods of time and that are inefficient for the transfer of oxygen. As an example, bubbles having diameters greater than 3 mm only transfer between 4 and 8% of oxygen to the water. This leads to a very small influence zone of the aeration process, as well as low reactivity for carrying out the oxygen degradation of organic compounds. Further, in these conventional processes, macrobubbles fundamentally act as "agitators" having low residency times in the aqueous medium.

U.S. Pat. No. 7,662,288 discloses a system using micro-nano bubbles, i.e. a mixture of microbubbles having a diameter greater than 50 μm and nanobubbles having a diameter between 100 and 200 nm, in a production device and a detoxification device that can be used for pretreatment of treatment water in a wastewater treatment.

By using ultrafine bubbles, transfer rates from oxygen into water of up to 95% have been observed, compared with traditional bubbling systems (see, e.g. Chu et al., *Enhanced treatment of practical textile wastewater by microbubble ozonation*, 2008).

The methods for wastewater treatment using ultrafine bubbles of the prior art have not yet been applied to the oil industry, since a significant reduction in chemical oxygen demand (COD) and TPH levels is required. In this industry, the wastewaters often comprise volatile organic compounds (VOCs) dissolved in water, so that an increased VOC degradation performance would be desirable.

There is therefore a need to provide methods of treatment of hydrocarbons dissolved in water having increased efficiency over methods related to conventional aeration or advanced oxidation, in terms of discharge parameters, costs, and maintenance times.

SUMMARY

The present invention provides an alternative to the methods employing ultrafine bubbles of the prior art that can be advantageously applied to wastewater treatment for the oil industry, such wastewater comprising larger numbers of hydrocarbon mixtures of varied initial concentrations. By employing specific ultrafine bubble generation and flow conditions, the method and apparatus provided by the invention can achieve an increased degradation of organic contaminants in water, while also obtaining a biocidal effect for microorganism removal. Further, the method provided by the invention has negligible corrosion effects over carbon steel.

The present invention provides a method for wastewater treatment, comprising contacting ultrafine bubbles having a diameter of 200 nm or less with a wastewater volume in continuous flow conditions.

In a preferred embodiment, the ultrafine bubbles are contacted for at least the time required for recycling the wastewater volume 16 times. More generally, the ultrafine bubbles are contacted with the wastewater volume the necessary recycling time according to the components and/or the initial concentrations and/or the target value for disposal. Even more preferably, the ultrafine bubbles are contacted for about 18 to about 20 minutes per liter wastewater volume, preferably 19.5 min per liter wastewater volume.

In another preferred embodiment, the ultrafine bubbles have a diameter in the range of 50 to 200 nm. More preferably, the ultrafine bubbles have a diameter in the range of 70 to 150 nm.

In a preferred embodiment, the ultrafine bubbles comprise a gas selected from oxygen, air, ozone, and mixtures thereof. More preferably, the ultrafine bubbles are oxygen bubbles.

In a preferred embodiment, the method comprises continuously recirculating the wastewater volume treated with ultrafine bubbles. Preferably, the ultrafine bubble concentration is about $10^9$ per milliliter wastewater volume.

The present invention further provides an apparatus specifically adapted for carrying out the method of the invention, comprising:

an ultrafine bubble generator,
a source of oxygen,
a tank,
a first pump and a second pump,
a pipe system and connectors,
wherein the first pump and the second pump are connected to the tank, the second water pump being also connected to the ultrafine bubble generator and the source of oxygen being connected to the ultrafine bubble generator, and

wherein the connectors are configured such that continuous flow conditions are maintained in the pipe system while carrying out the method of any one of the preceding claims.

Preferably, the connectors are configured such that the pipe system does not have right angles in direction changes.

In preferred embodiments, the ultrafine bubble generator is configured to generate ultrafine bubbles having a diameter in the range of 50 to 200 nm. More preferably, the ultrafine bubble generator is configured to generate ultrafine bubbles having a diameter in the range of 70 to 150 nm.

In other preferred embodiments, the apparatus further comprises recirculating means for continuously recirculating a wastewater flow comprising ultrafine bubbles into the tank. Preferably, the ultrafine bubble generator is configured for an ultrafine bubble concentration of about $10^9$ per milliliter wastewater volume in the tank.

DETAILED DESCRIPTION

Figure 1:
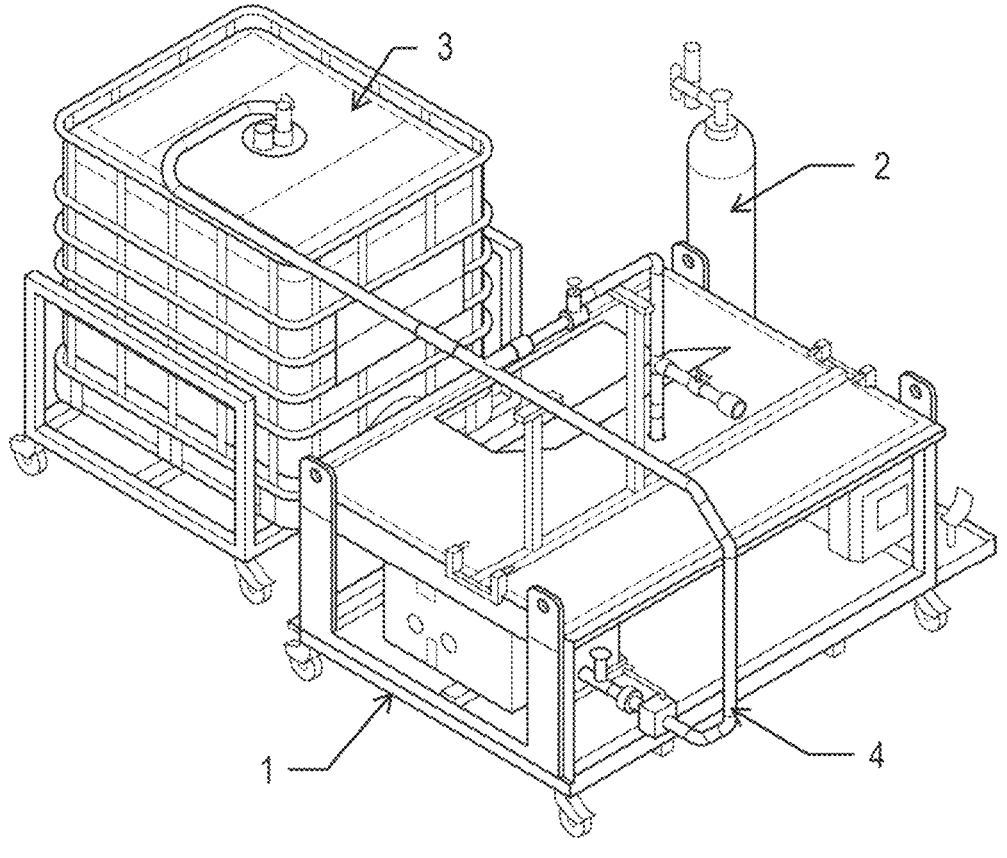
FIG. 1 shows the apparatus provided by the invention according to an exemplary embodiment.

The method and apparatus provided by the invention will be described in further detail below, with reference to the accompanying figures and examples.

The term "ultrafine bubbles" as used herein refers to bubbles having a diameter lower than 200 nm.

As used herein, the term "continuous flow" refers to flow of fluid obtained in an apparatus designed without interruptions to the fluid flow, allowing for a linear fluid installation as well as for efficient mixing between the wastewater and the gas. In practice, this condition is achieved by avoiding the use of accessories, such as valves, elbows or other connectors, having sharp angles in the flow system, which would create flow disturbances and instability.

The method provided by the invention comprises using ultrafine bubbles for wastewater treatment in the oil industry, by ensuring bubble size, i.e. diameter, and flow conditions resulting in an increased hydrocarbon degradation rate, thereby aiding their removal. Surprisingly, it was found that, in continuous flow conditions as defined ut supra, a greater number of ultrafine bubbles having decreased diameters can be obtained. On the other hand, recirculating the fluid increased the ultrafine bubble density, i.e. the number of ultrafine bubbles per unit volume.

The ultrafine bubbles of the invention feature stabilities and diameters such that their oxidative power allows for in situ degradation of organic compounds dissolved in water.

The method of the invention can be applied to wastewater from service stations, industrial water treatment plants, underground water, and the like.

The wastewater to be treated may comprise organic compounds such as hydrocarbons, e.g. methyl tert-butyl ether (MTBE), aromatic hydrocarbons such as benzene, toluene, ethylbenzene and xylene (ortho-, meta- and para-) (BTEX), as well as hydrocarbons from key petroleum products, such as gasoil, diesel, mineral oil and the like.

The ultrafine bubbles allow degradation of these compounds in water. The initial concentration of the dissolved hydrocarbons is relevant to treatment time. It was found that for an initial MTBE concentration of 7 ppm a removal of about 41% was reached after 120 min of in situ continuous ultrafine bubble generation for MTBE in laboratory conditions, while removal at 30 h was of about 90%. In field conditions, with an initial concentration of 293 ppb, a 95% removal after 34 h of treatment and undetectable levels of MTBE (initial concentration of 3 ppm) was obtained after treating the effluent with ultrafine bubbles for 70 hours.

In addition, it was found that the use of ultrafine bubbles provides a biocidal effect, e.g. reducing the concentration of potentially harmful bacteria, viruses, and the like in the treated water.

Ultrafine bubbles were also shown to successfully degrade aromatic hydrocarbons, such as BTEX and the like. It was determined that it is possible to decrease their concentration in water below the detection limit.

It was also observed that in complex mixtures of dissolved hydrocarbons such as benzene, toluene, ethylbenzene, polycyclic aromatic hydrocarbons (PAH), the nanobubbles are not selective and the degradation depends on the initial concentration and the ease of the molecule to be degraded by oxidation of hydroxyl.

It was found that degradation is more efficient when the ultrafine bubbles are continuously generated. Generation of ultrafine bubbles may be achieved using available commercial bubble generators, while ensuring the adequate flow conditions so that bubble size is kept within a certain value, preferably close to or less than about 200 nm.

The invention further provides a module or apparatus specially designed and adapted for carrying out the method provided by the invention in a wastewater treatment process.

Figure 7:
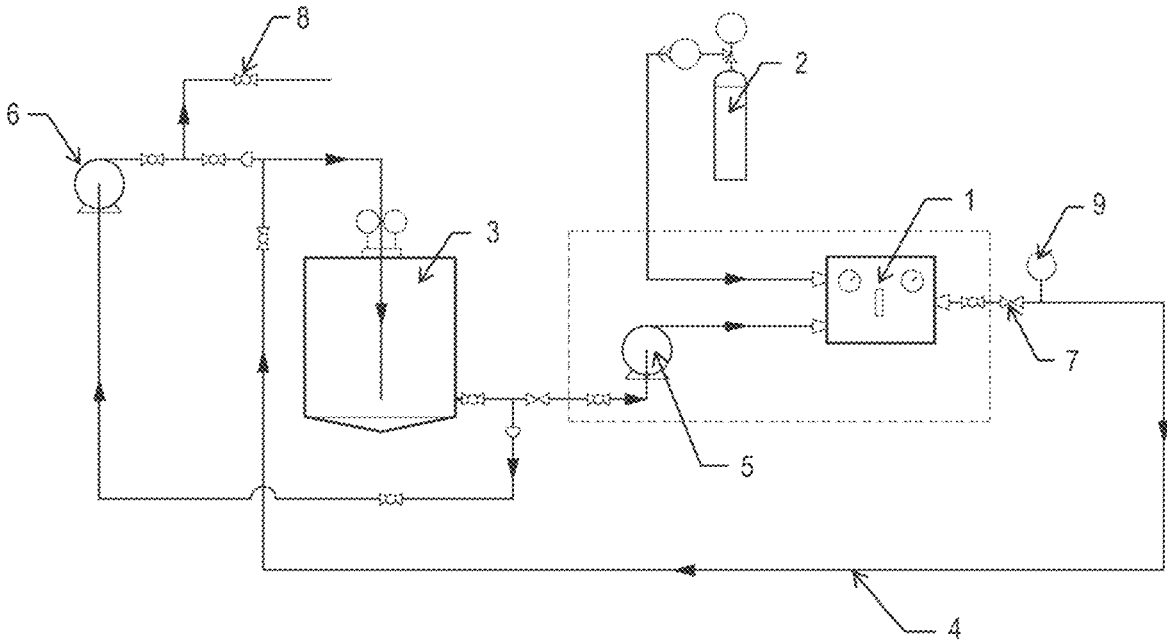
FIG. 7 shows the process diagram of the apparatus provided by the invention according to an exemplary embodiment.

Exemplary embodiments of such module or apparatus are shown in FIG. 1, while FIG. 7 shows a flow diagram representative of the apparatus and method. With reference to these figures, the module comprises an ultrafine bubble generator 1, a source of oxygen 2, a 1 m³ tank for holding the wastewater 3, a pipe system 6 with connectors, a first water pump 5 and a second water pump 6. Additional elements or accessories, such as needle valves 7, spherical valves 8 or a pressure meter 9 may be included in the system for purposes of process control.

The module, in particular the connectors, are configured such that the amount of right or acute angles is minimized, in order to maintain conditions of continuous flow. As mentioned above, these conditions enable the ultrafine bubbles to promote increased hydrocarbon degradation.

The pipe system connected to the source of oxygen, e.g. an oxygen tube, is configured such that the edges where direction changes occur are smooth, minimizing the right angles in the system to obtain conditions of continuous flow. This is achieved by a plurality of different pipe segments of the pipe system being connected by connectors, such as a plurality of flanges, as seen in the pipe system 4 of FIG. 1.

For ultrafine bubble generation, the tank is filled with the wastewater, e.g. effluent or solution to be treated, using the first water pump. The tank is connected to the ultrafine bubble generator by means of a second water pump, which drives fluid to the generator. The oxygen tube is also connected to the generator inlet and, by means of a regulation valve, the flow of oxygen entering the generator can be controlled. The outlet of the generator is connected to the tank by means of a hose.

This configuration allows recirculating the liquid containing ultrafine bubbles during a residency time sufficient for a desired oxygen over-saturation level to be reached.

The ultrafine bubble generator may be a commercially available equipment adapted to produce $10^9$ ultrafine bubbles per milliliter of liquid. The module may optionally comprise a mass flow meter, in order to regulate gas consumption.

In comparison with chemical oxidation methods of the prior art, the method provided by the invention does not require specific reagents other than oxygen, a controlled addition or maintaining a stoichiometric balance, therefore easing operation and maintenance.

Further, compared with other chemical oxidation methods or other methods employing bubbles, the method provided by the invention shows an increased hydrocarbon removal rate.

The invention will be illustrated below by non-limiting examples related to its advantageous aspects.

EXAMPLES

Bubble size measurement was performed with a Zetasizer Nano ZS equipment, Malverm Panalytical, a dynamic light scattering system measuring particle diameters in a measurement range of 0.3 nm to 10.0 microns.

For visually tracking the size and counting the ultrafine bubbles, the Malvern Panalytical NanoSight LM10 instrument was used, which utilizes Nanoparticle Tracking Analysis (NTA) to characterize nanoparticles with sizes ranging from from 10 nm to 100 nm in solution. Both bubble size and concentration are measured. Ultrafine bubble concentration in the experiments was $10^9$+/−1%.

The examples show degradation of compounds of interest and the relevant parameters for process monitoring Example 1—Oxygen Dissolution The level of dissolved oxygen (DO) in water is relevant for the aerobic degradation reactions mediated by bacteria, as well as chemical oxidation of organic compounds dissolved in water.

Aeration experiments in water were carried with atmospheric air was obtaining bubbles with a diameter of 132 nm on average.

DO was measured using a portable multi-parameter meter with multi-sensor probe.

Results show an initial DO of about 7.8 mg/L, reaching a DO of 22 mg/L after 5 min aeration. Once aeration is stopped, DO was measured to be of about 15 mg/L over more than 30 min, without the need for a further aeration cycle.

These results show that the in-situ generation of ultrafine bubbles as provided by the invention can be used to obtain increased DO levels, suitable for the chemical oxidation of organic compounds, such as dissolved hydrocarbons.

Example 2—Hydrocarbon Degradation: Methylene Blue

The method provided by the present invention was carried out to assess its effect on hydrocarbon degradation.

On a laboratory scale, the degradation by chemical oxidation of methylene blue (MB) was verified. 50 mL of a 20 ppm aqueous solution of methylene blue was bubbled with air for 3 hours, the bubbles having an average diameter of 100 nm. The solutions were left in contact with water containing ultrafine bubbles for 24 h.

The concentration of methylene blue was estimated using a UV-visible spectrometer to measure solution absorbance at different wavelengths. The absorbance at 664 nm was recorded for MB.

A decrease in absorbance was detected only in the sample comprising bubbles during the first hour of bubbling. This decrease in absorbance is equivalent to a hydrocarbon degradation of about 60%.

Example 3—Hydrocarbon Degradation Total Petroleum Hydrocarbons (TPH) in Water

Wastewater with an initial concentration of 42.6 ppm TPH was treated with bubbles of oxygen, having an average diameter of 100 nm.

TPH concentration was quantified by gas chromatography using the methodology TNRCC Method 1005—Total Petroleum Hydrocarbons. The quantification limit (QL) for TPH in water being ≤5 ppm, values lower than the QL were reached after between 7 to 8 hours of treatment.

Table 1 below shows the initial and final concentration of TPH in wastewater. 30 samples were collected during the treatment with ultrafine bubbles, but after sample No. 8, the sample concentration was lower than the LQ or equivalent to "undetectable concentrations" in wastewater.

TABLE 1

Decrease in TPH concentration in wastewater using oxygen ultrafine bubbles

| | | | Treatment time | | | | | | | |
|---|---|---|---|---|---|---|---|---|---|---|
| Sample | Method | Unit | 0 1 | 30 min 2 | 1 h 3 | 1 h 30 min 4 | 2 h 5 | 5 h 6 | 6 h 7 | 8 h 8 |
| Total Hydrocarbons of C6-C35 | TNRCC1005 | mg/L | 42.6 | 36.1 | 37 | 26.6 | 20.3 | 13.2 | 13.0 | <5 |

Figure 2:
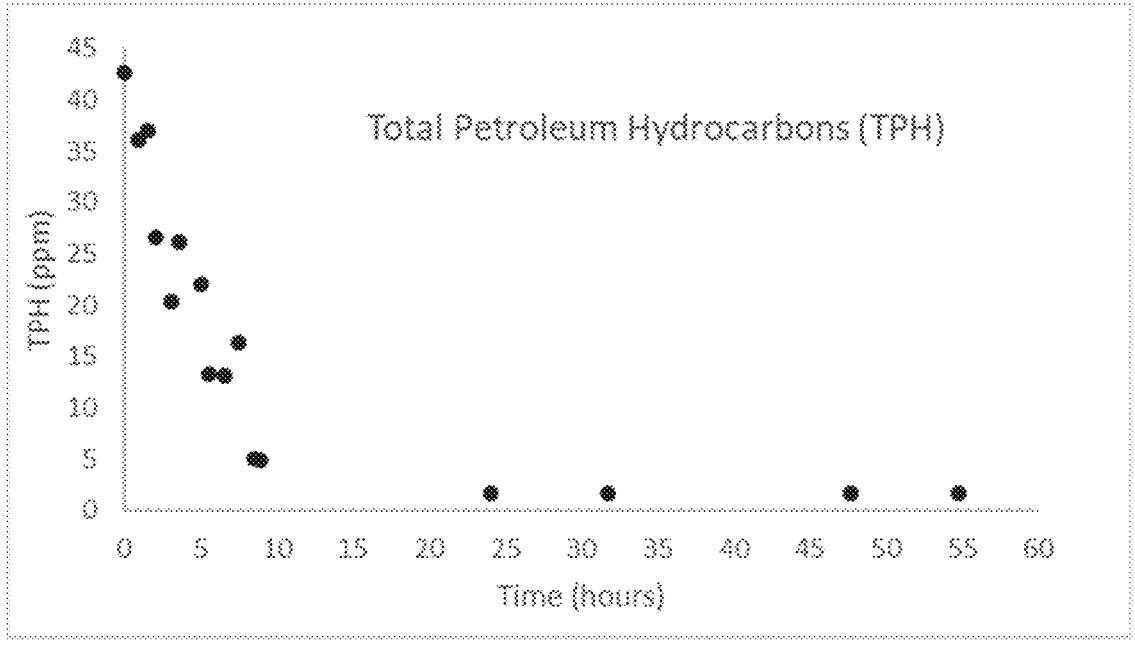
FIG. 2 shows results for Total Petroleum Hydrocarbons (TPH) in water degradation using the method provided by the invention.
Figure 3:
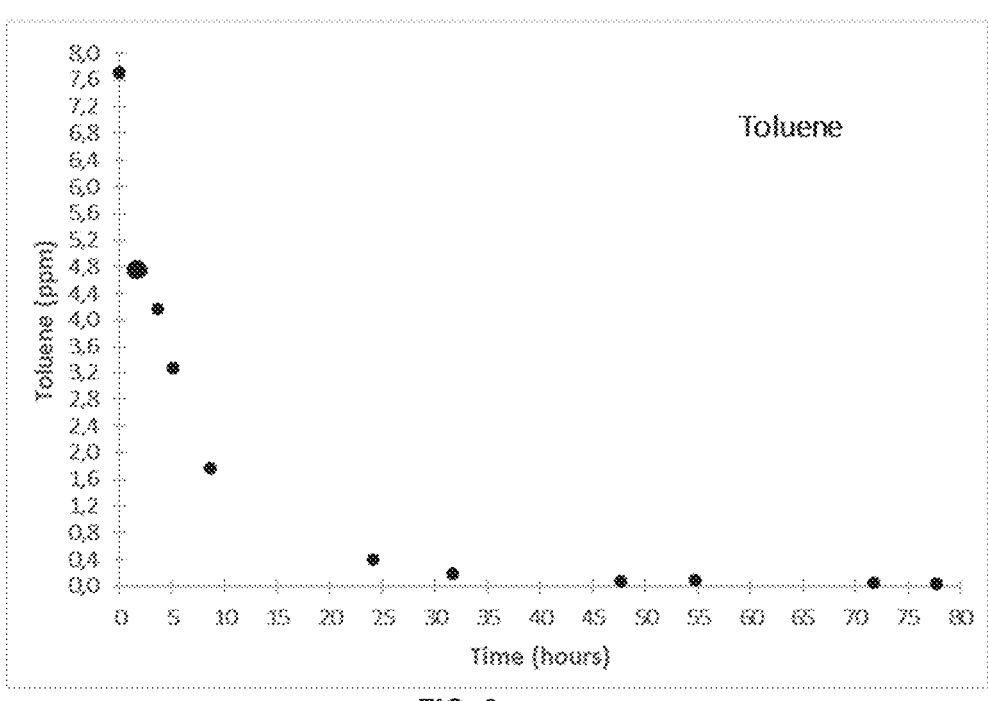
FIG. 3 shows results for toluene in water degradation using the method provided by the invention.

FIG. 2 shows results for Total Petroleum Hydrocarbons (TPH) in water degradation using the method provided by the invention.

Example 4—Bubbled Gas and Flow Conditions

Experiments were carried out to compare the degradation results using air, oxygen, and ozone. Wastewater from service stations were bubbled with air, oxygen, and ozone. The experiments were carried out in continuous flow conditions, with the experimental equipment, e.g. pipes, valves, accessories such as elbows or joints, etc., arranged in such a way that no sharp edges, e.g. right angles, or sudden changes in direction occur within the system, so as to avoid turbulent flow as much as possible.

Figure 6:
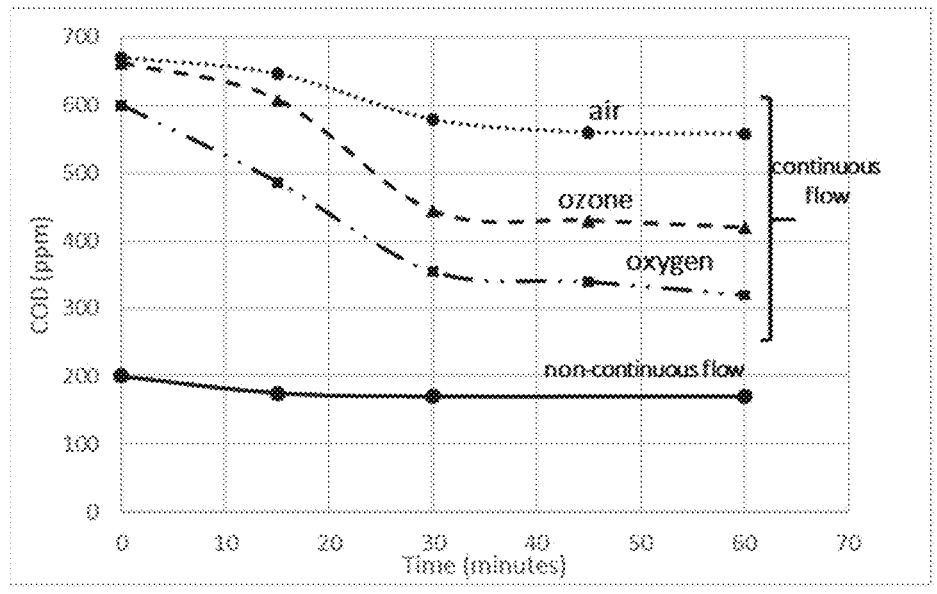
FIG. 6 shows results for COD of solutions as a function of treatment time and gas selection for ultrafine bubble formation using the method provided by the present invention.

For comparative purposes, equivalent experiments were carried out using oxygen bubbling but in conditions that do not ensure continuous flow, i.e. using elbows with right angles. FIG. 6 shows a photograph of both "non-continuous" and "continuous" experimental setups.

FIG. 6 shows the results for COD of the solutions as a function of treatment time.

From the preceding figures, it can be seen that the decrease in COD is about 10 times larger for the setup in continuous flow conditions. For both setups, COD decrease is more pronounced during the first 30 min of bubbling.

Results indicate that COD is further decreased when using oxygen bubbles, as compared with air and ozone bubbles.

As regards bubble size, results showed an average size of about 200 nm for the experiments carried out in the "non-continuous setup", while the setup in continuous flow conditions provided bubbles of an average size of about 70 nm.

Example 5—Field Experiment: Removal of Methyl Tert-Butyl Ether (MTBE) in Wastewater About 80 L of water with an initial concentration of MTBE of 0.293 ppm were continuously treated for 26 h with oxygen bubbles with diameters less than 150 nm. Several tests were also carried out with synthetic laboratory samples with initial concentrations of MTBE in water of 7.33 and 6.33 ppm, with treatments of 120 minutes and 30 hours respectively.

MTBE concentration was quantified by gas chromatography using the methodology SW-846 Test Method 8260D: Volatile Organic Compounds by Gas Chromatography/Mass Spectrometry (GC/MS). The quantification limit (LQ) for MTBE in water was 2 ppb.

Table 2 below summarizes the results for MTBE removal, as well as the determined kinetic parameters, correlation factors and half-life times.

TABLE 2

| Reaction kinetics parameters, from experimental data | | | | |
|---|---|---|---|---|
| MTBE initial concentration (ppm) | k (1/horas) | $r^2$ | $t^{1/2}$ (horas) | % total removal |
| 6.33 | 0.132 | 0.8349 | 5.25 | 90 |
| 0.293 | 0.144 | 0.9922 | 4.82 | 95 |
| 3.0 | 0.048 | 0.8633 | 14.4 | 91 |
| 3.011 | 0.055 | 0.9222 | 12.5 | 99.9* |

*Below quantification limit (2 ppb). Extended essay (>90 h).

Example 6—Field Experiment: Removal of MTBE and Aromatic Organic Compounds in Wastewater A field experiment was carried out using wastewater. This water contains dissolved MTBE and BTEX, was treated for a total time of 49.5 h, with oxygen ultrafine bubbles with diameters less than 150 nm.

Figure 4:
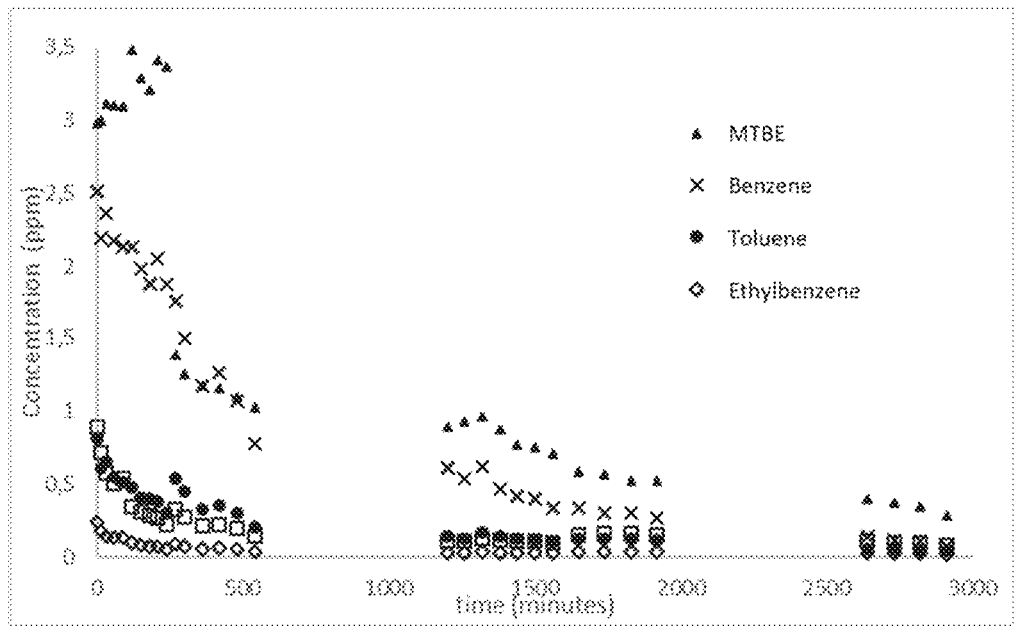
FIG. 4 shows results for MTBE and BTEX (benzene, toluene, ethylbenzene and xylenes) in water degradation of solutions as a function of treatment time using the method provided by the present invention.
Figure 5:
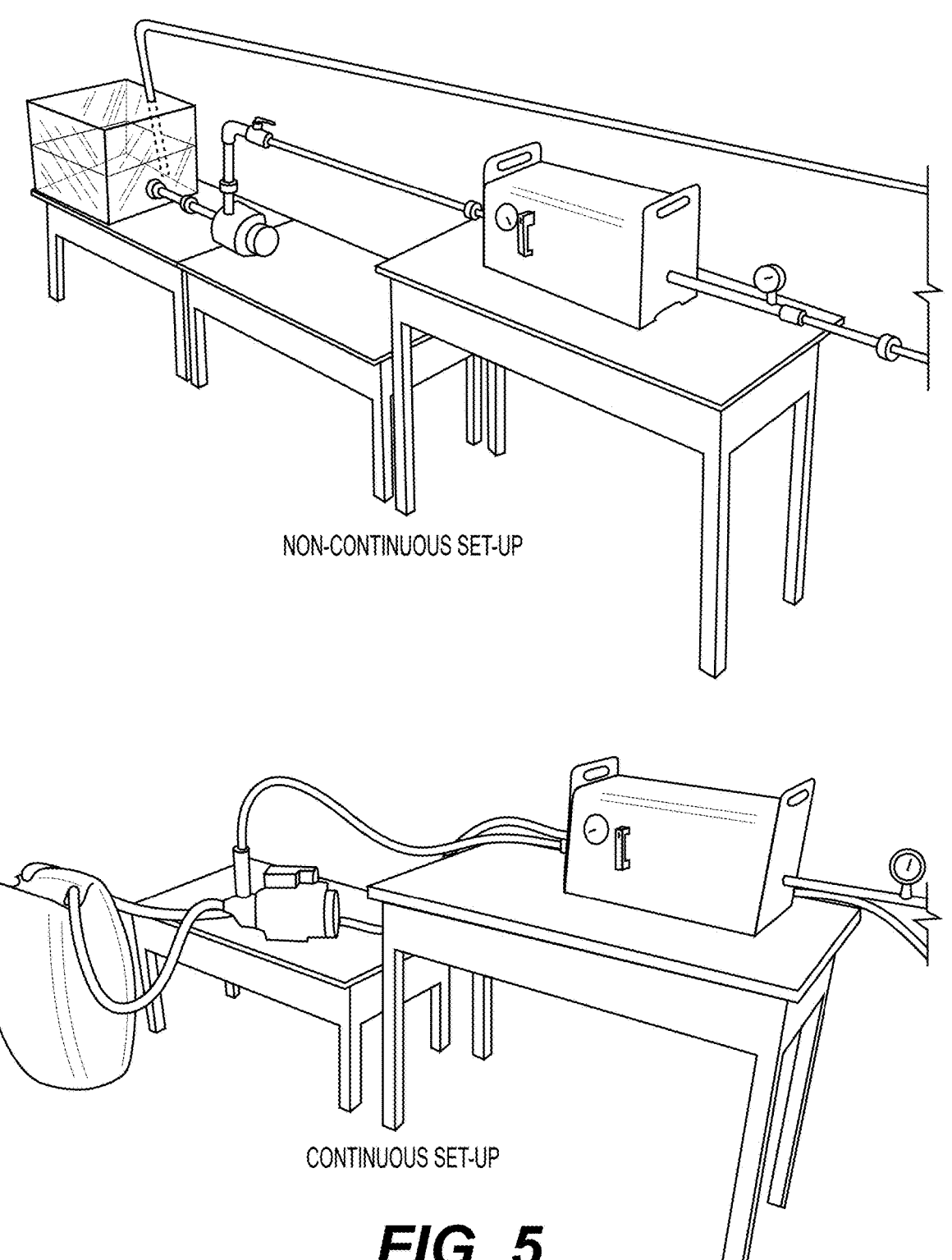
FIG. 5 shows a photograph illustrating experimental setups corresponding to "non-continuous" and "continuous" flow conditions in the context of the present invention

FIG. 4 shows the decrease in hydrocarbon concentrations as a function of time. The kinetic parameters for each hydrocarbon species was determined using the concentration data.

BTEX concentration was quantified by gas chromatography following the SW-846 Test Method 8260D: Volatile Organic Compounds by Gas Chromatography/Mass Spectrometry (GC/MS). The quantification limit (LQ) was ≤0.01 ppm for BTEX in wastewater.

Table 3 below summarizes the results for MTBE and aromatic hydrocarbons removal, as well as the determined kinetic parameters, correlation factors and half-life times.

TABLE 3

| Removal of MTBE and organic aromatic compounds in wastewater using ultrafine bubbles | | | | |
|---|---|---|---|---|
| | MTBE | Benzene | Toluene | Ethyl-benzene | Total Xylenes |
| Initial Concentration (ppm) | 2.98 | 2.51 | 0.82 | 0.24 | 0.9 |
| Kinetic constant k (1/hours) | 0.474 | 0.067 | 0.054 | na | na |
| Kinetic constant k ($ppm^{-1} h^{-1}$) | na | na | na | 0.751 | 0.183 |
| $r^2$ | 0.8633 | 0.9840 | 0.9424 | 0.8182 | 0.7768 |
| $t_{1/2}$ (hours) | 14.6 | 10.5 | 12.6 | 5.6 | 6.2 |
| % Total removal | 90 | 97 | 94 | 92 | 91 | na: not applicable

It was observed that in complex mixtures of dissolved hydrocarbons, the nanobubbles are not selective and the degradation depends on the initial concentration of the compounds and the ease of their respective molecules to be degraded by oxidation of hydroxyl.

Example 7—Biocidal Effect of Ultrafine Bubbles

On several samples of wastewater, generated after processes associated with the oil industry, it was assessed for number of viable bacteria before and after treatment with the process provided by the invention.

Colony forming units (CFU) counts were performed before treatment, during treatment, and at the end of wastewater treatment, using conventional microbiology techniques: Total Aerobic Bacteria count, sp. Mesophiles. In all cases the decrease percentage was of about 92%.

In addition to hydrocarbon degradation, this biocidal effect is an advantageous feature of the method provided by invention.

Example 8—Steel Corrosion Using Ultrafine Bubbles

The potential corrosive effect of water comprising oxygen ultrafine bubbles was assessed in a corrosion rate test on carbon steel C1018. The average corrosion rate (Vcorr) of a cylindrical specimen of carbon steel C1018 was measured using conventional electrochemical methods.

Electrochemical method to determine the corrosion rate of engineering alloys is based on the measurement of resistance to polarization (Rp) by the potentiodynamic polarization method.

Oxygen ultra-fine bubbles of 150 nm in diameter were generated for 8 h in tap water. The DO value in tap water was 7.8 mg/L, while in tap water with ultrafine bubbles DO was 11.2 mg/L The corrosion rate was measured in samples related to two systems: i) tap water ii) water with oxygen ultrafine bubbles.

The obtained values for Vcorr after 24 h were of about 0.1 y 0.09 mm/year for both systems, which can be considered equivalent. Therefore, the corrosive effect of the ultrafine bubbles is negligible.

The invention claimed is:

1. A method for wastewater treatment, consisting of contacting ultrafine bubbles having a diameter in a range of 70 to 150 nm with wastewater in an apparatus operating in continuous flow conditions of the wastewater and the ultrafine bubbles, and continuously recirculating the wastewater treated with said ultrafine bubbles, wherein the wastewater that is continuously recirculated comprises the ultrafine bubbles in a concentration of about $10^9$ per milliliter wastewater, wherein right angle connectors are not used during operating the apparatus and the wastewater flow through the apparatus is not turbulent throughout an entirety of the apparatus, wherein the ultrafine bubbles comprise a gas selected from oxygen, air, ozone, and mixtures thereof, and wherein contacting the wastewater with the ultrafine bubbles degrades in situ dissolved organic compounds within the wastewater.

2. The method according to claim 1, wherein the ultrafine bubbles are contacted for about 18 to about 20 minutes per liter wastewater.

3. The method according to claim 1, wherein the ultrafine bubbles are oxygen bubbles.

* * * * *